(12) United States Patent
Davis et al.

(10) Patent No.: US 6,731,737 B2
(45) Date of Patent: May 4, 2004

(54) DIRECTORY ASSISTANCE SYSTEM

(75) Inventors: Brent L. Davis, Deerfield Beach, FL (US); Reza Ghasemi, Pompano Beach, FL (US); Tracy Kong, Coral Springs, FL (US); John R. Lauria, Wellington, FL (US); Vanessa V. Michelini, Coconut Creek, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/794,785

(22) Filed: Feb. 27, 2001

(65) Prior Publication Data

US 2002/0118811 A1 Aug. 29, 2002

(51) Int. Cl.[7] ................... H04M 1/64; H04M 3/493; H04M 3/50
(52) U.S. Cl. ............... 379/218.01; 379/88.01; 379/142.06; 379/207.15
(58) Field of Search ............ 379/88.01, 88.03, 379/142.06, 207.15, 218.01, 218.02, 223, 903

(56) References Cited

U.S. PATENT DOCUMENTS

| | | | | |
|---|---|---|---|---|
| 5,204,894 A | * | 4/1993 | Darden ................. | 379/88.03 |
| 5,483,586 A | * | 1/1996 | Sussman ............... | 379/218.01 |
| 5,652,789 A | * | 7/1997 | Miner et al. .......... | 379/201.01 |
| 5,943,417 A | * | 8/1999 | Cox et al. ............. | 379/266.02 |
| 6,000,031 A | * | 12/1999 | Bingaman et al. .... | 713/200 |
| 6,005,927 A | * | 12/1999 | Rahrer et al. ......... | 379/142.01 |
| 6,404,884 B1 | * | 6/2002 | Marwell et al. ...... | 379/265.13 |

* cited by examiner

*Primary Examiner*—Harry S. Hong
(74) *Attorney, Agent, or Firm*—Akerman Senterfitt

(57) ABSTRACT

A directory assistance system in accordance with the inventive arrangements includes a general directory, having a first names list; at least one caller specific directory having a caller specific names list; a caller identification system, the caller identification system identifying a caller, the caller identity being processed to select a caller specific directory from among the at least one caller specific directories; and, a telephone interface for receiving directory queries from the caller. As such, the system can search the caller specific directory responsive to identifying the caller, associating the caller with the caller specific directory, and receiving a directory query. Notably, the directory assistance system can be a voice activated directory assistance system. A method for performing directory assistance is also disclosed.

33 Claims, 3 Drawing Sheets

DIRECTORY ASSISTANCE SYSTEM

BACKGROUND OF THE INVENTION

1. Technical Field

This invention relates generally to directory assistance systems, and more particularly to systems and methods for facilitating the provision of directory assistance services.

2. Description of the Related Art

Directory assistance systems, particularly those based on speech recognition, are a popular solution today to directory assistance problems. Such systems usually prompt the caller with an informative message to guide the caller to say the required information. An example is:

what name, please?
what city, please?
what listing?

In a small directory, the number of duplicate names is normally low and the caller can find the desired information without major problems. In larger directories and special circumstances, the number of duplicate names can be problematic. The system must be prepared to receive more than one database entry as the result of a caller request and present the options to the caller so that he or she can select the correct choice. An example is as follows:

Welcome to XYZ Company Directory Assistance. Who do you wish to call?
"John Smith"
There are two John Smiths. Say "1" to call John Smith at Department A or 2 to call John Smith at Department B.

One common solution to reduce the number of ambiguations is to select a directory by a segmented rule. For example:

Welcome to XYZ Company Directory Assistance. What department, please?
"Department A"
What name, please?
"John Smith"

There are situations where segmentation is not sufficient to eliminate ambiguations. For example:

What city, please?
"Fort Lauderdale"
What listing, please?
"ABC Hotel"
There are three ABC Hotels in Fort Lauderdale. Say "1" to select ABC Hotel Airport, two to select ABC Hotel Ocean View, or three to select ABC Hotel International Trade Center. Another alternative is to make a complete conversational system which only disambiguates as needed. This approach, however, is expensive to implement.

SUMMARY OF THE INVENTION

A directory assistance system in accordance with the inventive arrangements includes a general directory, having a first names list; at least one caller specific directory having a caller specific names list; a caller identification system, the caller identification system identifying a caller, the caller identity being processed to select a caller specific directory from among the at least one caller specific directories; and, a telephone interface for receiving directory queries from the caller. As such, the system can search the caller specific directory responsive to identifying the caller, associating the caller with the caller specific directory, and receiving a directory query. Notably, the directory assistance system can be a voice activated directory assistance system.

In one aspect of the invention, the caller identification system can include caller ID structure, wherein the directory assistance system can be adapted to compare caller ID information with stored caller identity information. Also, the caller identification system further can include structure for processing caller password information. Furthermore, the general directory can be segmented. Finally, Also, caller specific names list can include at least in part names selected from the first names list.

In operation, the directory assistance system can search the general directory upon receipt of a command from the caller. In particular, the directory assistance system can be configured to search the general directory and the caller specific directory in response to receiving a directory query. The directory assistance system also can be configured to search the general directory if requested data corresponding to a directory query is not located in the caller specific directory. Finally, the directory assistance system further can be configured to permit callers to enter information not present in the general directory into the caller specific directory.

According to a method of the invention, directory assistance is performed by providing a general directory having a first names list and a caller specific directory having a second names list. The second names list comprises at least in part names selected from the first names list. Caller identity information is processed and a caller specific directory is located for the caller. A directory request is received from the caller, and the caller specific directory is searched in response to identifying the caller and associating the caller with the caller specific directory. Commands from the caller can be voice commands, and can be processed using a speech recognition system.

In one aspect, the method comprises identifying the caller using caller ID technology. In another aspect, the caller is identified by receiving caller identity and password information from the caller, and processing this information to determine the identity of the caller.

The general directory and caller specific directory can be searched in response to a query from the caller. Alternatively, the general directory can be searched only if the selected name is not located in the caller specific directory.

The general directory can be segmented, such that the caller is first requested to provide directory assistance information to segment the general directory. The segmented directory information can also be used to segment the caller's caller specific directory. The method can include the step of permitting the caller to add names and telephone numbers or extensions to the caller specific directory which are not in the general directory.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
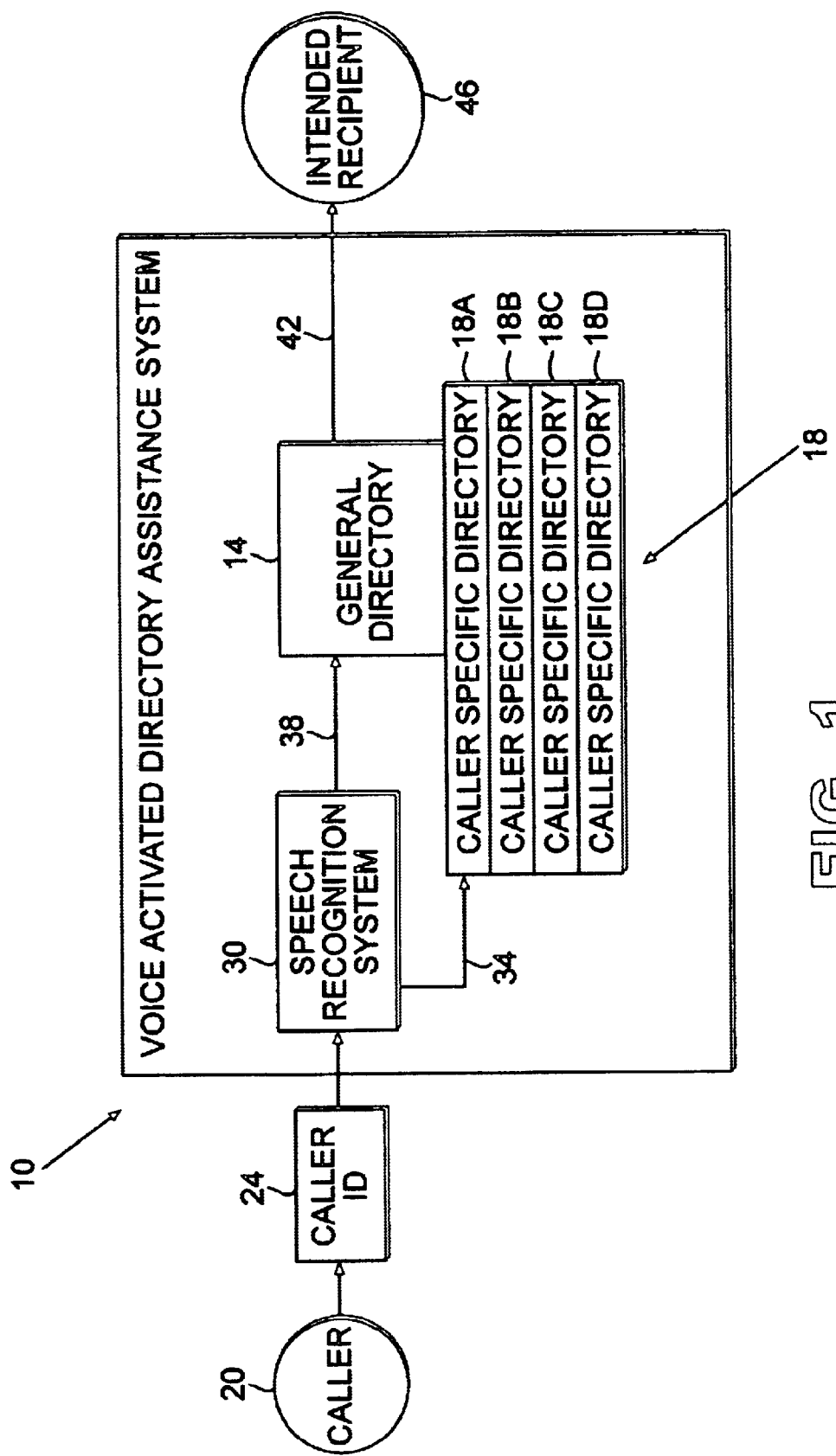
FIG. 1 is a schematic diagram of a directory assistance system according to a first aspect of the present invention.

There is shown in FIG. 1 a directory assistance system 10 according to the invention. The directory assistance system 10 can comprise a general directory 14 and caller specific directories 18. The general directory 14 comprises a list of directory names or other suitable addresses, together with telephone extensions or phone numbers. The caller specific directories 18 contain additional lists of names or addresses and telephone numbers. The caller specific directories 18 comprise lists of names or addresses and extensions or telephone numbers for a specific caller. As is shown in FIG. 1, there preferably will be several caller specific directories such as the directories 18A–D, although any number of caller specific directories can be provided.

Each caller specific directory 18A–18D is comprised of a list of names or addresses at least in part selected from the general directory 14. A caller 20 can create a particular caller specific directory, such as a caller specific directory 18A, for that particular caller. The caller creates the directory by selecting names from the general directory which the caller will call most often. Although the names comprised in the caller specific directory for the caller will typically be selected from the general directory, it is also possible to provide for the input of directory data by the caller such that names and addresses not present in the general directory can be entered into the caller's own caller specific directory.

The directory assistance system 10 includes caller identity structure 24. The caller identity structure 24 receives information about the caller 20 so as to identify the caller 20. This can be standard caller ID technology, or other suitable technology. Caller ID technology identifies the incoming telephone number from the caller 20, and processes this information against stored caller telephone number to identify the caller 20. More than one telephone number can be entered for a particular caller 20 so that the caller can utilize the invention from different locations (e.g. office, home, cellular phone). Alternatively, the caller identity structure 24 can be adapted to receive caller identity information from the caller. A password might also be required for security purposes.

Once the caller 20 has been identified, a caller specific directory, for example the caller specific directory 18A, can be located for the caller 20. Also, a search request is received from the caller 20 for a particular name. Notably, the query can be processed by a speech recognition system 30 in the case of a voice activated directory assistance system. Notably, when using speech recognition system 30 to convert spoken queries to computer processable queries, the speech recognition system 30 can utilize both general directory grammars and one or more specific directory grammars.

Similar to convention speech recognition grammars, the task of the directory grammars is to express restrictions imposed on the manner in which words can be combined in the system. Thus, the general directory can have a set of grammars associated with it and these grammars can always be loaded for use by the speech recognition system. Additionally, a caller specific directory is created, a grammar also can be created containing the names and other information in the caller specific directory. The caller specific directory grammars can be stored in a directory data base and retrieved when the system identifies the caller 20.

In any case, upon receiving a request, the request can be transferred to the particular caller specific directory 18A for the caller as indicated by arrow 34. The request can simultaneously be directed to the general directory as indicated by arrow 38, such that the caller's specific caller specific directory 18A and the general directory 14 are both searched. Upon location of the name or address that has been requested, a connection 42 is made to the intended recipient 46. Although the system is shown is shown with four caller specific directories 18A–D, it should be understood that any number of such caller specific directories can be provided. The invention can provide a caller specific directory for individual callers, but can also provide a caller specific directory for groups of callers. For example, if the caller is identified as being a part of Department A, the system can select a caller specific directory for all department A employees.

Figure 2:
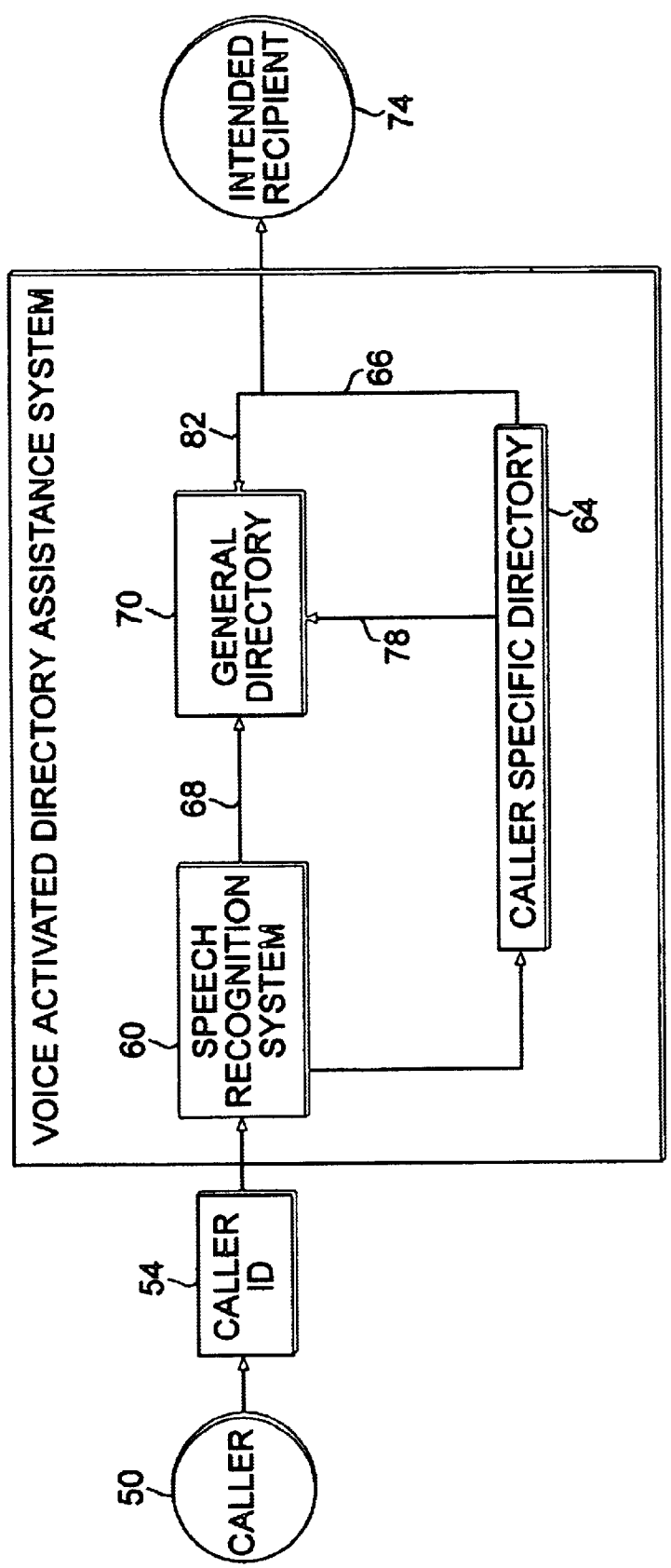
FIG. 2 is a schematic diagram of a directory assistance system according to a second aspect of the present invention.

A second embodiment of the invention is shown in FIG. 2. In this embodiment, the caller 50 is identified by caller identity structure 54. In a voice activated system, speech recognition system 60 processes a caller request and sends the request to appropriate caller specific directory 64 for the caller 50. If a caller specific directory is not available for the caller 50, the request is routed by path 68 to the general directory 70. If the requested name is located in the caller specific directory 64, a connection through path 66 is made to the intended recipient 74. If the name is not located in the caller specific directory 64, the request is passed via path 78 to the general directory 70 and then through path 82 to the intended recipient 74. In this manner, the general directory, which will usually contain more names than the caller specific directory, is not searched until it has been determined that the caller specific directory does not contain the requested name. The effect will be for greater processing speed for the directory assistance system, since the caller specific directory for the caller 50 has fewer names and is nonetheless more likely to contain the name of the intended recipient 74.

The invention can be described with reference to a specific example. Company XYZ has a directory assistance system to help callers to find the company employees by name (first name, last name). The system is available for anyone, however, employees can create a caller specific directory using their company extension as identification. Vanessa Michilini is an employee of Company XYZ. The following employees are in the company directory:

Tracy Kong, from Department A
John Smith, from Department A
John Smith, from Department B Brent Davis, from Department B Brent L. Davis, from Department B V. Michilini's personal profile is as follows:

Caller ID number: 1234567890

Name: Vanessa Michilini

Speed dial list:

John Smith (from Department B)

Brent L. Davis (from Department B)

When Miss Michilini calls from telephone 1234567890, the system will identify her and load her caller specific directory grammar besides the company directory grammar. The dialog can proceed as follows:

Welcome to XYZ Company directory assistance. Who do you wish to call?

"John Smith"

Connecting . . . just a minute.

Notably, as will be apparent from the above-identified personal profile, John Smith is in the speed dial list. In consequence, the request will return only one entry, instead of returning the two John Smiths that are in the main directory and prompting for disambiguation.

Referring to the same example, V. Michilini can also call Tracy Kong, who is not in the caller specific directory for V. Michilini. The system, as shown in FIG. 1, can load the general directory grammar, where here the general directory is the company directory:

Welcome to XYZ Company directory assistance. Who do you wish to call?

"Tracy Kong"

Connecting . . . just a minute.

The interaction with the directory assistance system of the invention is the same in both cases from the caller's perspective. If a caller is not subscribed to a caller specific directory, he/she will also be able to use the system, but the disambiguation feature of the invention using the caller specific directory will not be available to this caller.

Continuing with the above example, Company XYZ may also allow the caller to include names which are not part of the company directory. These names may be added to the caller specific directory for the caller through suitable input structure. For example, V. Michilini can include in her caller specific directory an entry for "Mom":

Welcome to XYZ Company directory assistance. Who do you wish to call?

"Mom"

Connecting . . . just a minute.

The interface between the caller and the system of the invention remains the same. The system of the invention also is useful in a segmented directory. Continuing with the above example, in segmenting the directory by the department name, if V. Michilini calls from her telephone 1234567890, the interaction with the system will be as follows:

Welcome to XYZ Company directory assistance. What department, please?

"Department B"

Who do wish to call in Department B?

"Brent Davis"

Brent L. Davis is in the caller specific directory for V. Michilini, and he will be called instead of Brent Davis, who is also in Department B. Since the caller specific directory grammar is loaded in the beginning of the call, even in a segmented directory the caller need only say the name of the person if the person is in the caller's caller specific directory. In this case, the prompt may be more generic and the caller should know what to say. The following are two call flow scenarios using the same example of a segmented directory:

Welcome to XYZ Company directory assistance. Who do you wish to call?

"Brent Davis"

Connecting . . . just a minute.

The system connects to Brent L. Davis at Department B.

Welcome to XYZ Company directory assistance. Who do you wish to call?

"Department A Tracy Kong"

Connecting . . . just a minute.

The system connects to Tracy Kong at Department A. There are other scenarios that can be supported by the system of the invention. In a non-segmented directory, V. Michilini can reach the other Brent Davis by including a suffix in the grammar such as AT CORPORATE, which makes the system search the general directory when V. Michilini asks for "Brent Davis at Corporate."

Figure 3:
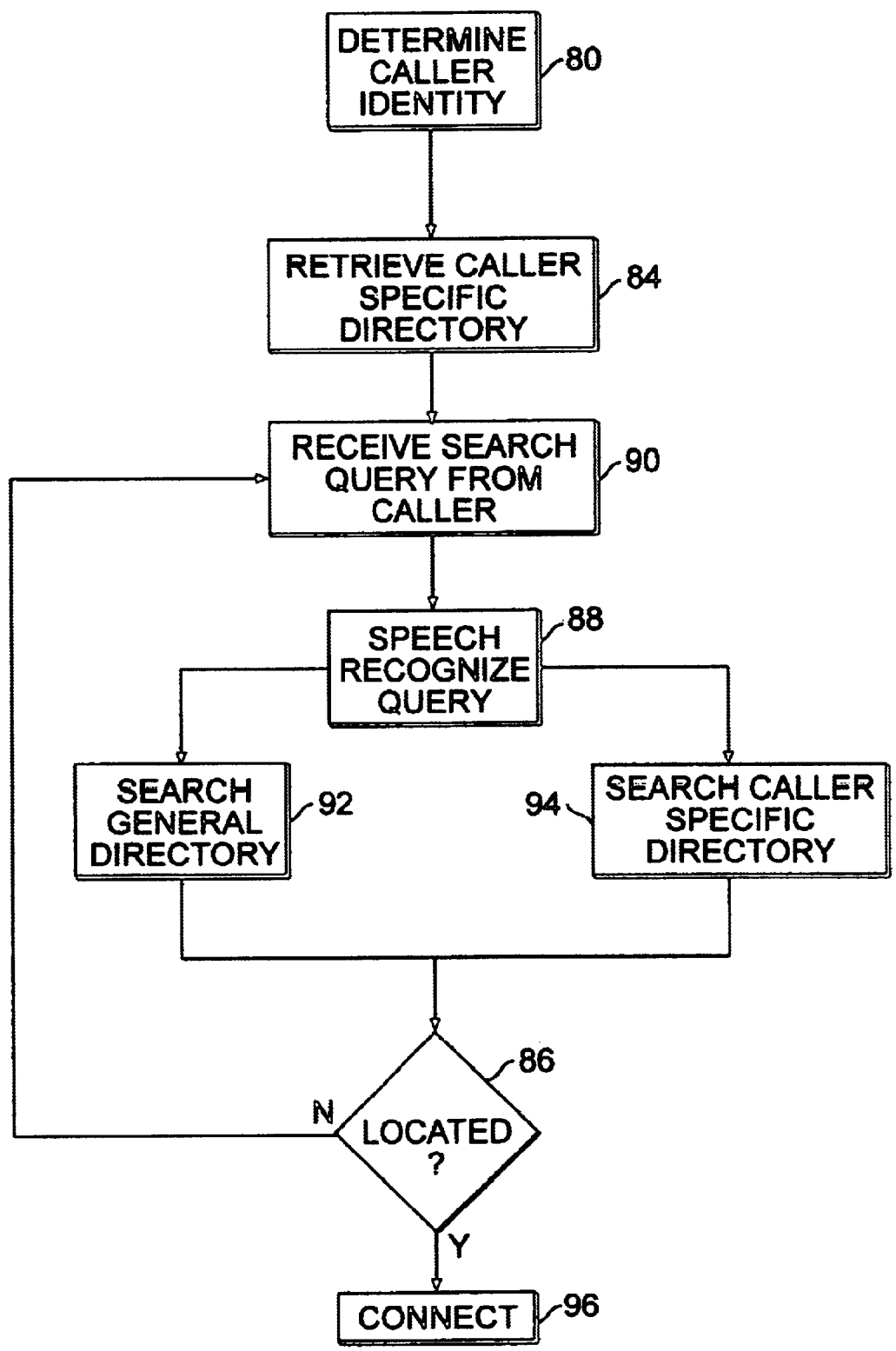
FIG. 3 is a flow chart illustrating a method for performing directory assistance according to the invention.

The method of the invention is illustrated with respect to FIG. 3. The caller identify is determined in a step 80. If the caller is identified, the caller specific directory for the caller is retrieved in step 84. In step 90, a search query can be received from the caller. In step 88, in the case of a voice activated directory assistance system, the search query can be speech-to-text converted for further processing in the system. Subsequently, in steps 92 and 94, the general directory and caller specific directory can be searched concurrently responsive to the query of step 90. If, in step 86 the name and telephone number/extension is located, the caller can be connected to the specified person in step 96. Otherwise, the process can repeat.

Notably, the present invention can be realized in hardware, software, or a combination of hardware and software. The method of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. A directory assistance system, comprising:

a general directory, having a first names list;

at least one caller specific directory having a caller specific names list, wherein said general directory and said caller specific directory are disposed within a telephony network;

a caller identification system, said caller identification system identifying a caller, said caller identity being processed to select a caller specific directory from among said at least one caller specific directories; and, a telephone interface for receiving directory queries from said caller;

whereby name ambiguities are resolved by selectively accessing a hierarchy of directories in a predetermined fashion so that said system can search said caller specific directory for matching names before searching said general directory.

2. The directory assistance system of claim 1, wherein said caller specific names list comprises at least in part names selected from said first names list.

3. The directory assistance system of claim 1, wherein said directory assistance system is a voice activated directory assistance system.

4. The directory assistance system of claim 1, wherein said caller identification system comprises caller ID structure, said directory assistance system being adapted to compare caller ID information with stored caller identity information.

5. The directory assistance system of claim 1, wherein said caller identification system further comprises structure for processing caller password information.

6. The directory assistance system of claim 1, wherein said directory assistance system is configured to search said general directory and said caller specific directory in response to receiving a directory query.

7. The directory assistance system of claim 1, wherein said directory assistance system is configured to search said general directory if requested data corresponding to a directory query is not located in said caller specific directory.

8. The directory assistance system of claim 1, wherein said general directory is segmented.

9. The directory assistance system of claim 1, wherein said directory assistance system searches said general directory upon receipt of a command from said caller.

10. The directory assistance system of claim 1, wherein said directory assistance system is configured to permit callers to enter information not present in said general directory into said caller specific directory.

11. A method for performing directory assistance, comprising the steps of:

providing a general directory having a first names list and at least one caller specific directory, each caller specific directory having a caller specific names list, wherein said general directory and said caller specific directory are disposed within a telephony network;

processing caller identity information to identify a caller;

selecting a caller specific directory for said caller;

receiving from said caller a directory query; and searching said caller specific directory in response to identifying said caller and associating said caller with said caller specific directory, whereby name ambiguities are resolved by selectively accessing a hierarchy of directories in a predetermined fashion so that said method can search said caller specific directory for matching names before searching said general directory.

12. The method of claim 11, wherein said caller specific names list comprises at least in part names selected from said first names list.

13. The method of claim 11, further comprising the step of receiving a spoken directory query from said caller, and speech-to-text converting said spoken directory query into a directory query which can be processed by a directory assistance system.

14. The method of claim 11, wherein said step of identifying said caller comprises receiving and processing caller ID information.

15. The method of claim 11, wherein said step of identifying said caller comprises processing at least one of caller identity and password information.

16. The method of claim 11, wherein said general directory and said caller specific directory are searched in response to receiving a directory query from said caller.

17. The method of claim 11, wherein said general directory is searched only if said name is not found in said caller specific directory.

18. The method of claim 11, further comprising the step of receiving and processing directory segmentation information from said caller.

19. The method of claim 11, wherein said general directory is searched upon receipt of a search command from said caller.

20. The method of claim 11, further comprising the step of receiving and storing name inputs in said caller specific directory from said caller.

21. A machine readable storage, having stored thereon a computer program for performing directory assistance, said computer program having a plurality of code sections executable by a machine for causing the machine to perform the steps of:

providing a general directory having a first names list and at least one caller specific directory, each caller specific directory having a caller specific names list, wherein said general directory and said caller specific directory are disposed within a telephony network;

processing caller identity information to identify a caller;

selecting a caller specific directory for said caller;

receiving from said caller a directory query; and searching said caller specific directory in response to identifying said caller and associating said caller with said caller specific directory, whereby name ambiguities are resolved by selectively accessing a hierarchy of directories in a predetermined fashion so that said computer program can search said caller specific directory for matching names before searching said general directory.

22. The machine readable storage of claim 21, wherein said caller specific names list comprises at least in part names selected from said first names list.

23. The machine readable storage of claim 21, further comprising the step of receiving a spoken directory query from said caller, and speech-to-text converting said spoken directory query into a directory query which can be processed by a directory assistance system.

24. The machine readable storage of claim 21, wherein said step of identifying said caller comprises receiving and processing caller ID information.

25. The machine readable storage of claim 21, wherein said step of identifying said caller comprises processing at least one of caller identity and password information.

26. The machine readable storage of claim 21, wherein said general directory and said caller specific directory are searched in response to receiving a directory query from said caller.

27. The machine readable storage of claim 21, wherein said general directory is searched only if said name is not found in said caller specific directory.

28. The machine readable storage of claim 21, further comprising the step of receiving and processing directory segmentation information from said caller.

29. The machine readable storage of claim 21, wherein said general directory is searched upon receipt of a search command from said caller.

30. The machine readable storage of claim 21, further comprising the step of receiving and storing name inputs in said caller specific directory from said caller.

31. The directory assistance system of claim 4, wherein said voice activated directory assistance system further comprises:

a speech recognition system comprising a general directory grammar and a caller specific directory grammar.

32. The method of claim is 13, wherein said speech-to-text converting step further comprises the step of:

comparing at least a portion of said spoken directory query against at least one of a general directory grammar and a caller specific directory grammar.

33. The machine readable storage of claim 23, wherein said speech-to-text converting step further comprises the step of:

comparing at least a portion of said spoken directory query against at least one of a general directory grammar and a caller specific directory grammar.

* * * * *